United States Patent [19]

Dorsemagen et al.

[11] 4,151,567
[45] Apr. 24, 1979

[54] CIRCUIT ARRANGEMENT FOR OFFSETTING THE DATA HEADS OF A DATA CYLINDER MEMORY BY A DETERMINATE AMOUNT FROM THE MID-POSITION OF THE DATA CYLINDER

[75] Inventors: Stephen Dorsemagen, Munich; Hermann Eiting, Unterpfaffenhofen, both of Fed. Rep. of Germany

[73] Assignee: Siemens Aktiengesellschaft, Berlin & Munich, Fed. Rep. of Germany

[21] Appl. No.: 805,640

[22] Filed: Jun. 13, 1977

[30] Foreign Application Priority Data

Jun. 3, 1976 [DE] Fed. Rep. of Germany ....... 2629473

[51] Int. Cl.² .............................................. G11B 5/56
[52] U.S. Cl. ...................................................... 360/75
[58] Field of Search ...................................... 360/75–77, 360/105, 106, 109, 135

[56] References Cited

U.S. PATENT DOCUMENTS

| 3,427,606 | 2/1969 | Black et al. | 360/77 |
| 3,812,533 | 5/1974 | Kimura et al. | 360/77 |
| 3,994,016 | 11/1976 | Moghadam | 360/77 |

Primary Examiner—John H. Wolff
Attorney, Agent, or Firm—Hill, Gross, Simpson, Van Santen, Steadman, Chiara & Simpson

[57] ABSTRACT

A circuit arrangement offsets the data heads of a data cylinder memory by a determinate amount from the mid-position of the data cylinder and uses a fine regulating circuit and a coarse regulating circuit. The circuit arrangement includes a track difference register, a digital/analog converter connected to the track difference register, and arrangement for forming the sign and a function generator, in which the amount of the desired track offset is input, in digital form, into the track difference register, and which is converted into an analog value by the subsequently connected digital/analog converter. The sign of the offset is produced in the coarse regulating circuit which has an arrangement provided for normal positioning. An analog switch is connected between the input and output of the function generator and linearizes the function generator when the same is closed when the regulating circuit is transferred to fine regulation. The output of the function generator is connected to a summing point located in the fine regulating circuit and at which the position error signal is supplied.

1 Claim, 1 Drawing Figure

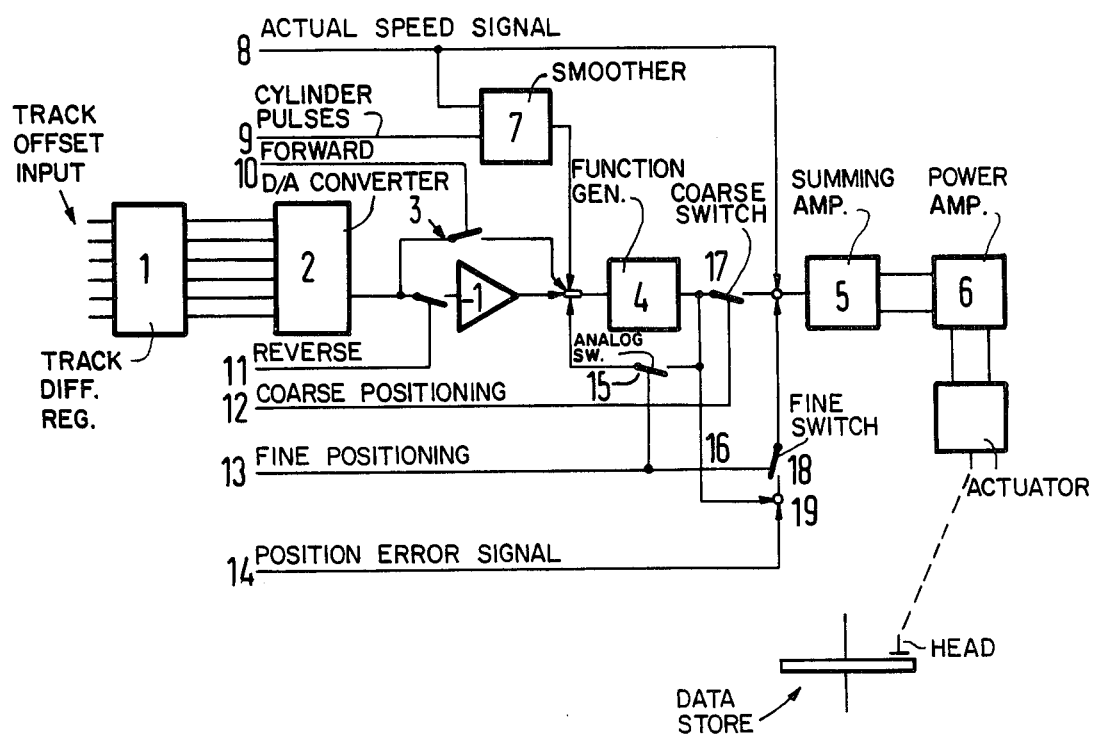

CIRCUIT ARRANGEMENT FOR OFFSETTING THE DATA HEADS OF A DATA CYLINDER MEMORY BY A DETERMINATE AMOUNT FROM THE MID-POSITION OF THE DATA CYLINDER

BACKGROUND OF THE INVENTION

1. Field of the Invention

The present invention relates to a circuit arrangement for offsetting the date heads of a data cylinder memory by a determinate amount from the so-called data cylinder mid-position (track offset), in particular using a fine regulating circuit and a coarse regulating circuit, and in particular to a circuit arrangement which comprises a track difference register, a digital/analog converter connected to the track difference register, a forward-/reverse circuit which serves to form the sign, and a function generator, in which the amount of the desired offset is input, in digital form, into the track difference register, and is converted into an analog value by the digital/analog converter.

2. Description of the Prior Art

The positioning system for the write-read heads of a disc memory must fulfill two basic functions:

(1) To find new data tracks in as short a time as possible; and
(2) To effect a precise position regulation of the heads on the data tracks during a reading process or a writing process.

Therefore, it is conventional to provide two regulating circuits which are intermeshed. A coarse regulating circuit is provided which contains a path-dependent speed regulation system of the positioner, and the path to be traveled to the new target track is stored, as a binary track difference (cylinder difference), in a difference register. The difference register is caused to count backwards with the cylinder pulses of the intersecting tracks. A digital/analog converter produces an analog value from the particular digital value. Depending upon the position of the target track, the analog value is then provided with a corresponding sign by way of a forward/reverse circuit, and with the aid of a function greater is distorted to form the theoretical speed signal. At the input of a summing amplifier, the theoretical and actual speed signals are then compared with one another, the difference between these signals is amplified, and a power amplifier is responsive to the signals to operate the positioning drive. A so-called "smoother" serves in a manner well known in the art to smooth the inconstant output function of the digital/analog converter.

A fine regulating system is responsible for the position of the data heads on the theoretical track. It is activated as soon as the difference register is reset to zero at the end of a positioning process. Here, the regulating value "path" is represented by the analog position error signal. In modern disc memories, this signal is derived from a special servo surface of the stack of discs. The position error signal is amplified in the summing amplifier and, by way of the power amplifier, causes the positioning drive to move in that direction in which the error signal becomes zero.

In addition to the two above-described basic functions, the position regulating device of a disc memory must also handle a series of subsidiary functions, including the function of "determinate offsetting of the data heads (track offset) by a few μm from the data cylinder mid-position", e.g. in the case of data tracks which are recorded in offset fashion or for head adjustment purposes.

In known data-cylinder memories, the positioning system is offset from the data cylinder center in 63 different steps toward both sides, and the amount of the desired offset is entered into the difference register provided in the coarse regulating circuit. It is further known to convert this offset quantity, contained in the difference register, into an analog value by way of the analog digital converter which is connected to the difference register. The known positioning system for data cylinder memories then withdraws this analog value from the coarse regulating circuit of the positioning system and feeds the same by way of a plurality of switches to a separate device which serves to produce the relevant sign of the offset. From the latter, the offset signal, provided with the sign, finally passes to a summing point at which it is combined with the position error signal.

In order to derive the amount of the offset signal from the coarse regulating circuit, this known device requires a plurality of analog switches, and also requires a separate device to produce the relevant sign of the offset, which must initially be considered disadvantageous in respect of the expense of the components. Furthermore, these components form additional fault sources and affect the accuracy of positioning.

SUMMARY OF THE INVENTION

Therefore, the object of the present invention is to provide a circuit arrangement of the type generally referred to above, and with which the expense can be reduced and the accuracy of the positioning can be increased.

According to the invention, the above object is achieved in that the sign of the offset is produced in the coarse regulating circuit with the forward/reverse circuit arrangement which is provided for the normal positioning and which serves to form the sign, between the input and output of the function generator an analog switch is connected which is closed when the regulating circuit is transferred to fine regulation, and in this way linearizes the function generator, and that the output of the function generator is connected to a summing point which is located in the fine regulating circuit and to which the position error signal is also supplied.

According to the present invention, therefore, as a result of this design of the circuit arrangement for offsetting the data heads of a data cylinder memory, the expense is reduced to a single switch for analog signals, in comparison to arrangements heretofore known.

BRIEF DESCRIPTION OF THE DRAWING

Other objects, features and advantages of the invention, its organization, construction and operation will be best understood from the following detailed description taken in conjunction with the accompanying drawing, on which there is but a single FIGURE which is a schematic circuit representation of a circuit arrangement constructed in accordance with the invention for offsetting the data heads of a data cylinder memory by a determinate amount from the mid-position of the data cylinder.

DESCRIPTION OF THE PREFERRED EMBODIMENT

The drawing illustrates the basic components of a position regulating device for a data cylinder memory, with a circuit arrangement constructed in accordance with the present invention for the offsetting of the data heads. The arrangement comprises a track difference register 1, in which the path to be traveled to the new target track is stored as a binary track difference. The track difference register 1 is caused to count backwards in a known manner by the cylinder pulses of the intersecting tracks. A digital/analog converter 2 is connected to the difference register 1 and produces an analog value from the digital value stored in the difference register 1. In dependence upon the position of the target track, the analog value is provided with an appropriate sign in a forward/reverse circuit 3, and with the aid of a following function generator 4 is distorted in a known manner to form the theoretical speed signal. At the input of a summing amplifier 5 the theoretical speed signal and the actual speed signal which has been supplied by way of the line 8 are then compared with one another and the difference therebetween is amplified and fed to a power amplifier 6 for actuating the positioning drive.

A smoother, in the form of a smoothing integrator 7, is connected on the one hand with the speed signal present on the line 8 and, on the other hand, with the cylinder pulses present on the line 9. The smoothing integrator 7 serves to smooth the inconstant output function of the digital/analog converter 2. A signal is supplied on the line 10 when a positioning is to take place in the reverse direction, and a signal is supplied on the line 11 when a positioning is to occur in the forward direction.

In addition to the coarse regulating circuit comprising the elements 1, 2, 3, 4 and 7, the position regulating device also contains a fine regulating circuit which is activated as soon as the difference register 1 is reset to zero at the end of the positioning process. In this case, the regulating value is represented by the analog position error signal. The position error signal is fed by way of a line 14 and when the position regulating device has transferred from the coarse regulating circuit to the fine regulating circuit, with the aid of signals on the lines 12 and 13, which alternately actuate two switches 17 and 18, is amplified in the summing amplifier 5, and by way of the power amplifier 6 causes the positioning drive to move in that direction in which the error signal becomes zero.

According to the invention, the sign of the track offset is produced in the coarse regulating circuit with the forward/reverse arrangement 3, provided for the known positioning, for sign formation. This is effected in a simple manner in that in the case of offsetting in the forward direction the line 11 is activated and in the case of offsetting in the reverse direction the line 10 is activated. In this way, an analog signal arises at the output of the arrangement 3, and represents not only the amount of the desired offset, but also the desired direction thereof. In order to linearize the following function generator 4 in the coarse regulating circuit, for offsetting, an analog switch 15 is connected between the input and output of the function generator, the switch 15 being closed when the regulating circuit transfers to the fine regulation, i.e. in response to the signal present on the line 13. Further, the output of the function generator 4 is connected to a summing point 19 which is located in the fine regulating circuit and at which the position error signal is also supplied.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of out contribution to the art.

We claim:

1. A positioning circuit arrangement for offsetting the data heads of a data cylinder memory by a determinate amount from the data cylinder mid-position, comprising a fine regulating circuit, a coarse regulating circuit including a track difference register for storing the offset distance in binary form, a digital/analog converter connected to said track difference register for converting the digital content to an analog signal, a function generator, and a forward/reverse arrangement which serves to form the sign of the analog signal which is indicative of the direction of offset, said forward/reverse arrangement including an inverter and a shunt for said inverter which are selectively connectible between said digital/analog converter and said function generator for reverse and forward directions, respectively, an analog switch in said fine regulating circuit connected between the input and output of said function generator and operated to a closed condition during fine regulation, for linearizing said function generator, a summing point connected to the output of said function generator and connectible to the drive for the data heads, and a position error signal input in said fine regulating circuit connected to said summing point for controlling fine positioning of the data heads.

* * * * *